(12) United States Patent
Nally et al.

(10) Patent No.: US 6,961,401 B1
(45) Date of Patent: Nov. 1, 2005

(54) RETRACTABLE PEDOMETER

(75) Inventors: Michael Nally, Ridgewood, NJ (US); Mark Schulz, Hackettstown, NJ (US)

(73) Assignee: Sportcraft, Ltd., Mt. Olive, NJ (US)

( * ) Notice: Subject to any disclaimer, the term of this patent is extended or adjusted under 35 U.S.C. 154(b) by 25 days.

(21) Appl. No.: 10/606,664

(22) Filed: Jun. 26, 2003

(51) Int. Cl.⁷ ............................................. G01C 21/00
(52) U.S. Cl. ................................................... 377/24.2
(58) Field of Search ................... 2/336–339; 242/371, 242/378, 379.2, 377, 400; 235/105; 377/24.2

(56) References Cited

U.S. PATENT DOCUMENTS

| | | | |
|---|---|---|---|
| 1,567,783 A | 12/1925 | Best ............................ | 242/376 |
| 4,126,024 A | 11/1978 | Timmons et al. ............. | 70/233 |
| 4,715,235 A | 12/1987 | Fukui et al. ............. | 73/862.68 |
| 4,756,171 A | 7/1988 | Homar ........................... | 70/18 |
| 4,970,882 A | 11/1990 | Arrendondo ................... | 70/30 |
| 5,117,444 A * | 5/1992 | Sutton et al. ............... | 377/24.2 |
| 5,718,100 A | 2/1998 | Petty ............................ | 53/399 |
| 5,938,137 A * | 8/1999 | Poulson ................... | 242/379.2 |
| 6,254,249 B1 * | 7/2001 | Kim et al. ................... | 362/109 |
| 6,752,946 B2 * | 6/2004 | Toyooka ..................... | 264/154 |
| 6,785,522 B2 * | 8/2004 | Ryu ........................ | 455/200.1 |
| 2001/0022828 A1 | 9/2001 | Pyles ........................ | 377/24.2 |

* cited by examiner

*Primary Examiner*—Margaret R. Wambach
(74) *Attorney, Agent, or Firm*—Fellers, Snider, Blankenship, Bailey & Tippens, P.C.

(57) ABSTRACT

A portable device, such as a pedometer or other device having a display portion that may be separated from an attachment portion for easier viewing. When separated, the display portion remains connected to the attachment portion to facilitate ease of re-attachment and for maintaining both parts of the device in an interconnected relationship. The attachment portion is removably connectable to a wearer. The display portion is extendably and retractably connected to the attachment module. A spring biased spool is provided in the attachment module to take up and release line connecting the display module to the attachment module. The display module has a receptacle formed on the back thereof. The attachment module has a protrusion extending from a back thereof for mating engagement with the receptacle when the display module and attachment module are in a retracted position.

14 Claims, 6 Drawing Sheets

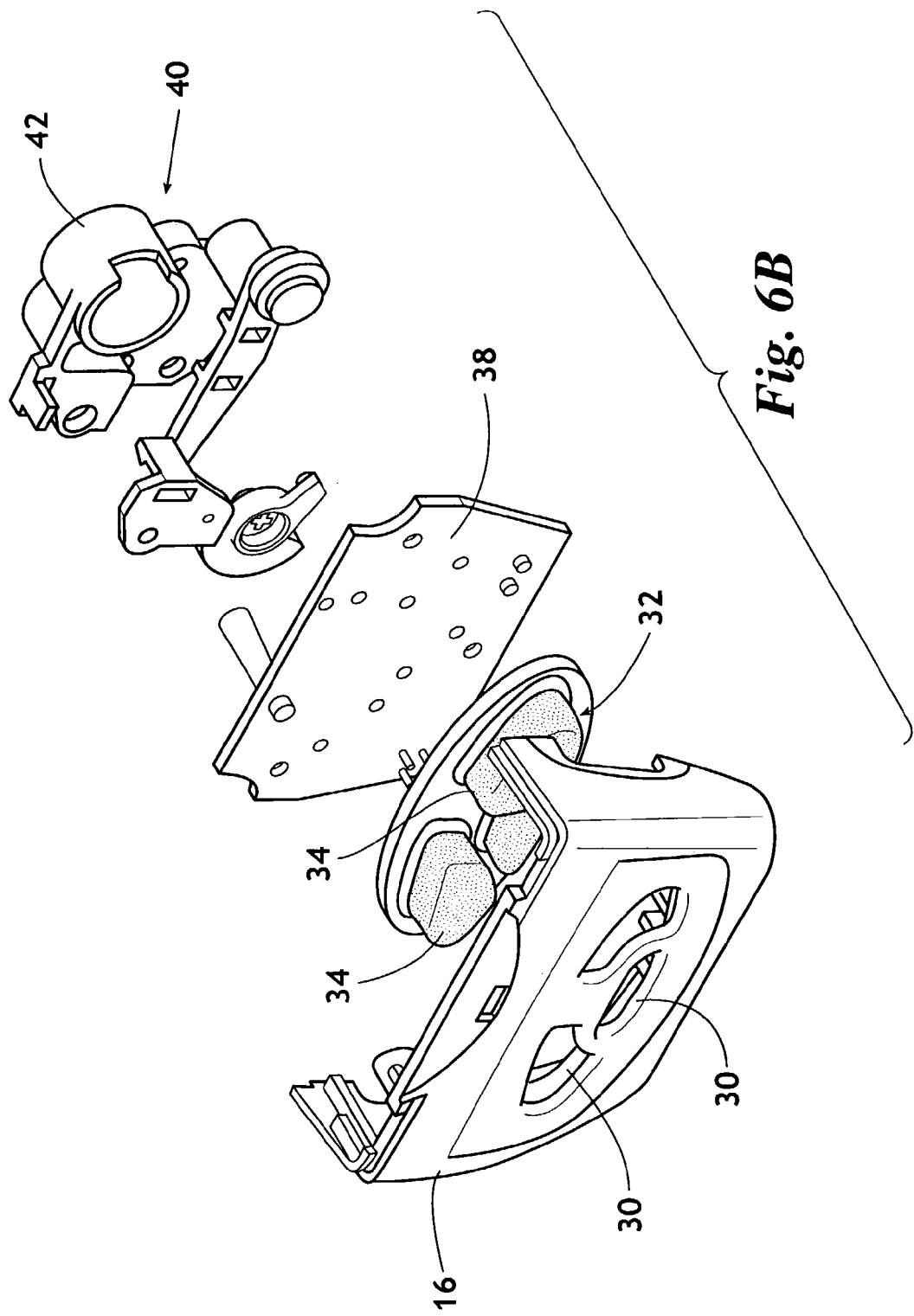

RETRACTABLE PEDOMETER

BACKGROUND OF THE INVENTION

1. Field of the Invention

This invention relates generally to portable devices attached to a wearer. More particularly, the invention relates to a pedometer having an attachment module that is attached to a wearer and having a display module retractably connected to the attachment module.

2. Background

Pedometers are used to measure the distance walked or run by a human wearer of the device. Typically, a pedometer measures distance by detecting the up and down motion made by the wearer during each stride. The distance traveled by the wearer of a pedometer is the length of the user's stride multiplied by the number of strides the wearer takes. Pedometers may employ a weighted pendulum suspended horizontally from an axis by a spring. The inertia of the pendulum's weight will cause the pendulum to move in relation to the pedometer each time the wearer takes a stride. A pedometer is most accurate when attached to the waist of a wearer since attachment to other areas of the body may detect movements that are not related to the stride of a wearer.

Other devices have been adapted for carrying on the waist of a wearer, either for use during exercise, e.g., walking, running, skating, etc, or for convenience to the wearer. Examples of such devices include radios, CD players, MP3 players and other devices.

Regardless of the type of device worn by the wearer, it is sometimes desirable to manipulate the device in some way while the device is being worn. For example, in the case of a pedometer, it is desirable to periodically check a display that indicates the distance covered. As another example, it may be desirable to change stations on a radio or select a particular song on a CD or MP3 player.

A problem with all of the above devices is that a belt clip or other attachment mechanism must be manipulated to remove the device from a belt or waistband and then the device must be replaced on the waistband. Some devices come with a separate belt clip portion. Such a configuration requires a user to detach the device from the belt clip portion and then re-insert the device within the belt clip portion. Removing and replacing a device from a belt or detaching and re-attaching a device in a belt clip can be difficult to perform while exercising. Additionally, in the case of the detachable belt clip device, a disadvantage associated with the device is that the pieces may become separated, which may render the device unsuitable for use.

SUMMARY OF THE INVENTION

According to the present invention there is provided an improvement in portable devices, such as a pedometer or other device. The portable device of the invention has a display portion that may be separated from an attachment portion of the device for easier viewing. The display portion remains attached via a retractable line to the attachment portion to facilitate ease of re-attachment and for maintaining both parts of the device in an interconnected relationship.

In particular, the portable device of the invention includes an attachment module for removably connecting to a wearer and a display module defining a window for displaying information. The display module is extendably and retractably connected to the attachment module. The display module has a front cabinet, a rear cabinet, and a top cover. The top cover defines a window for displaying information, preferably via an LCD or LED display, but optionally via other display means. A first button is provided for selectively illuminating a light acting on the display. A second button is provided for selectively changing a display mode of the device. To secure the devices together, the display module has a receptacle formed on the back thereof. The attachment module has a protrusion extending from a back thereof for mating engagement with the receptacle when the display module and attachment module are in a retracted position. The display module is connectably extendable and retractable from the attachment module. In one example, the display module defines a pair of line orifices for allowing a first cable and a second cable to pass therethrough for attachment to the display module. The other ends of the first and second cable are attached to a spool housed in the attachment module. The spool is biased in a winding direction by a biasing member. The spool simultaneously retracts or plays out the first cable and the second cable depending on how a user manipulates the display module. It is contemplated that other means of extendably and retractably connecting the display module and the attachment module may be utilized if desired.

In use, the attachment member is secured to a wearer. To view a display on the display module, the wearer may grasp the display module and impart a separating force to the display module to pull the display module away from the attachment module. Line connecting the attachment module and the display module is played out from the spool by pulling the display module away from the attachment module. The display module may then be manipulated such that the display is easy to view. While returning the display module to a position proximate the attachment module, a biasing force acting on the spool winds the line on the spool. Once the module is returned to a location adjacent the attachment module, the line maintains the display module in proximity to the attachment module when the display module is released by a wearer.

A better understanding of the present invention, its several aspects, and its advantages will become apparent to those skilled in the art from the following detailed description, taken in conjunction with the attached drawings, wherein there is shown and described the preferred embodiment of the invention, simply by way of illustration of the best mode contemplated for carrying out the invention.

BRIEF DESCRIPTION OF THE DRAWINGS

FIG. 3 is a side cross-sectional view of the portable exercise device of FIG. 1 taken along line 3—3 of FIG. 1.

FIGS. 6A and 6B are an exploded perspective view of the portable exercise device of FIG. 1.

DETAILED DESCRIPTION OF THE PREFERRED EMBODIMENT

Figure 1:
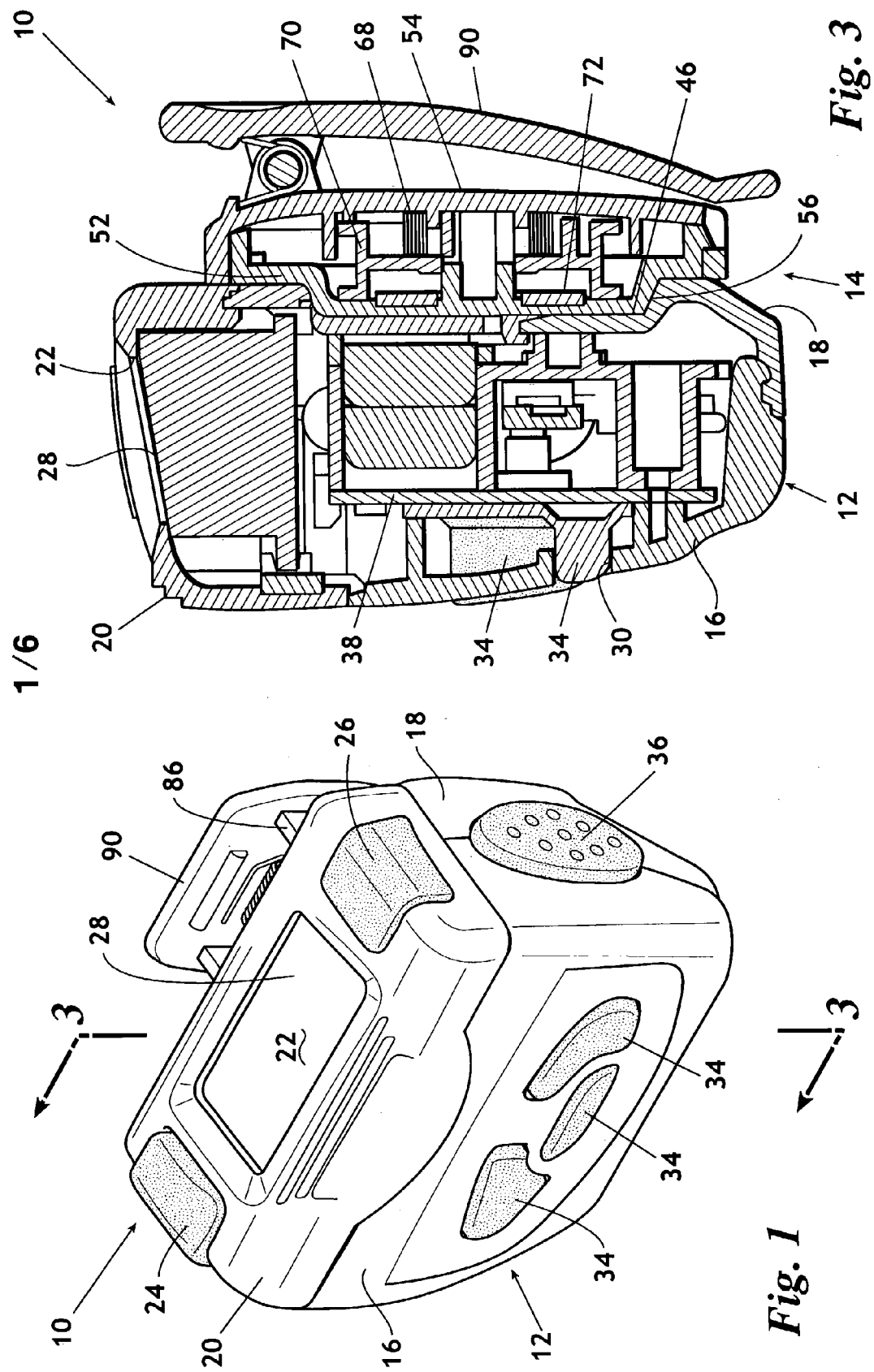
FIG. 1 is a perspective view of a portable exercise device in a retracted position.
Figure 2:
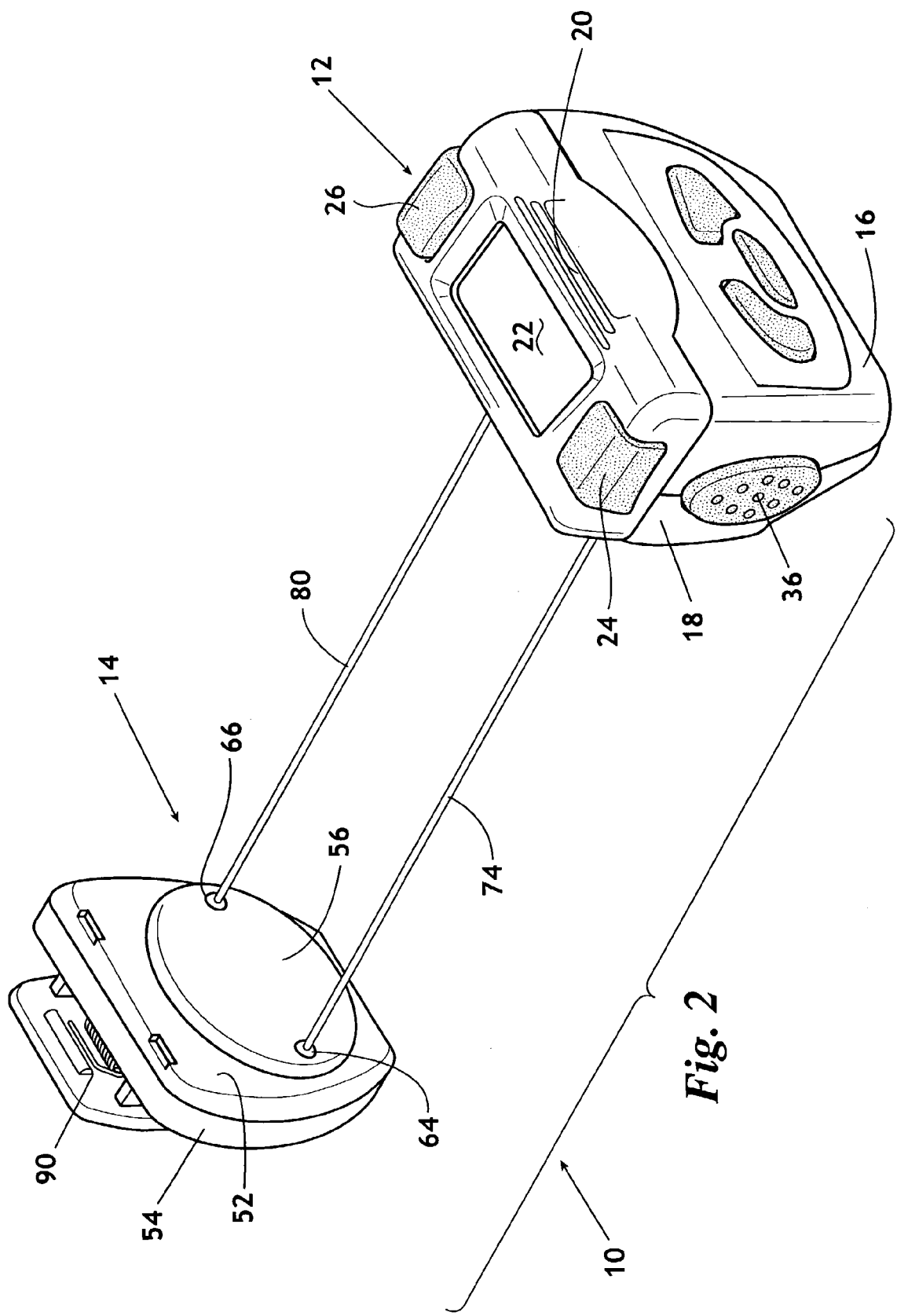
FIG. 2 is a perspective view of the portable exercise device of FIG. 1 in an extended position.

Before explaining the present invention in detail, it is important to understand that the invention is not limited in its application to the details of the embodiments and steps described herein. The invention is capable of other embodiments and of being practiced or carried out in a variety of ways. It is to be understood that the phraseology and terminology employed herein is for the purpose of description and not of limitation.

Referring now to FIGS. 1 through 6, shown is a portable exercise device 10. Portable exercise device 10 is made up of a display module 12 and an attachment module 14. Display module 12 is made up of the front cabinet 16, a rear cabinet 18 and a top cover 20. Top cover 20 defines a window 22 for displaying information to a user. Preferably, a first button 24 is accessible through the top cover 20. First button 24 may be used to activate a light for illuminating information displayed through window 22. Additionally, a second button 26 is preferably provided, which is also accessible through top cover 20. Second button 26 may be used to change information displayed through window 22. An LCD display 28 (FIGS. 1, 3 and 6A) is located beneath the top cover 20 for displaying information through the window 22.

Front cabinet 16 defines a plurality of holes 30 therein (FIGS. 3 and 6B). A front keypad 32 (FIG. 6B) is positioned inside display module 12 behind the front cabinet 16. Front keypad 32 includes a plurality of keys 34 that protrude through the holes 30 in the front cabinet 16. Rubber pads 36 are located on each side of the display module 12. Rubber pads 36 are preferably positioned in an interface between the front cabinet 16 and the rear cabinet 18.

A mounting plate 38 (FIGS. 3 and 6B) is preferably located within the display module 12. An actuator assembly 40 (FIG. 6B) is affixed to rear side of the mounting plate 38. A battery receptacle 42 (FIG. 6B) is preferably attached to the actuator assembly 40.

Rear cabinet 18 has a battery door 44 (FIG. 4) formed therein to provide access to the battery receptacle 42. The rear cabinet 18 further defines a recessed area 46 (FIGS. 3 and 4), a first housing line orifice 48 and a second housing line orifice 50 (FIG. 4) therein.

Figure 5:
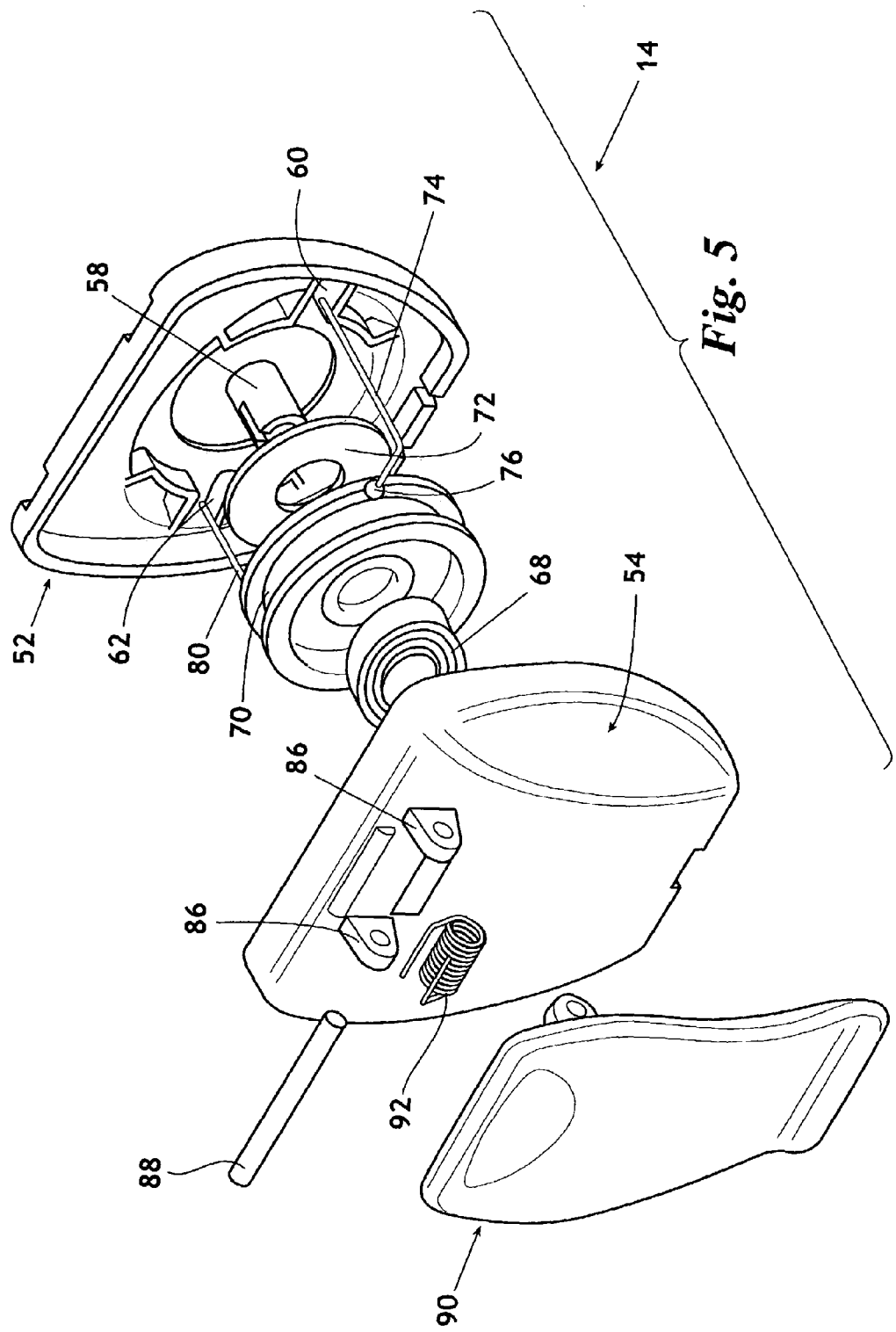
FIG. 5 is an exploded perspective view of the attachment module which forms a part of the portable exercise device shown in FIG. 1.
Figure 6A:
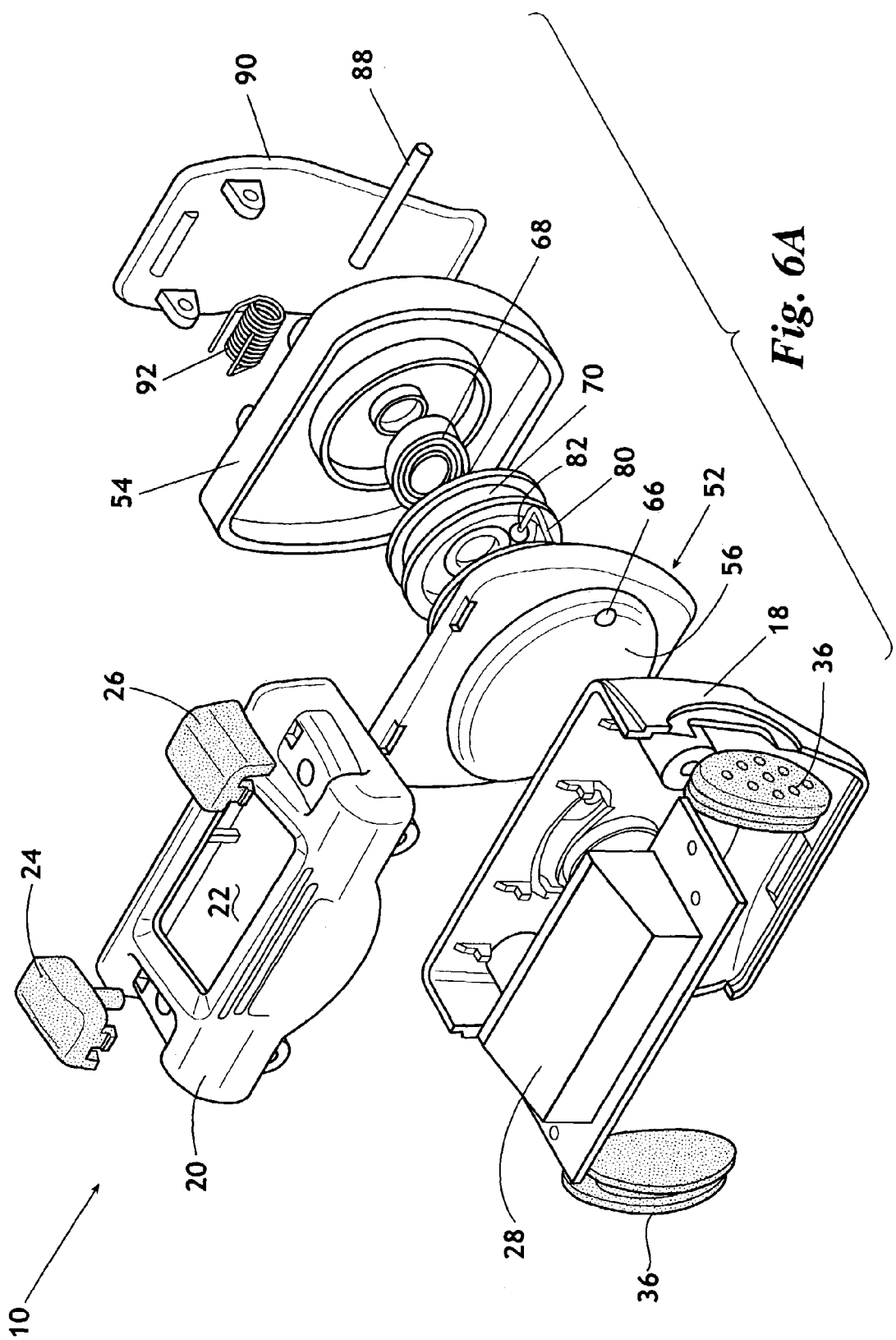

Referring now primarily to FIG. 5, attachment module 14 is made up of a spool cover 52 and a clip holder 54. Spool cover 52 defines a protrusion 56 (FIGS. 2 and 6A) having an outer surface that engages in mating relationship with the recessed area 46 of the rear cabinet 18. Spool cover 52 has an inner surface that defines an axle member 58 (FIG. 5). A first channel 60 extends radially outward from axle member 58 on an inner surface of the spool cover 52. Spool cover 52 also defines a second channel 62 that extends radially outward from axle member 58. Spool cover 52 further defines a first attachment module line orifice 64 (FIG. 2) that communicates with an outer end of the first channel 60 and a second cable orifice 66 (FIGS. 2 and 6A) that communicates with an outer end of the second channel 62.

A spring member 68 (FIGS. 3, 5 and 6A) is provided that engages an inside surface of the clip holder 54. A spool 70 (FIGS. 3, 5 and 6A) is located in the attachment module 14 between the spool cover 52 and the clip holder 54. Spool 70 is rotationally mounted on axle member 58 of spool cover 52. Spool 70 is rotationally biased in a first direction by spring member 68. A metal washer 72 (FIG. 5) is also mounted on axle member 58 and is located between the spool 70 and the spool cover 52.

A first cable 74 (FIGS. 2 and 5) has a first end 76 (FIG. 5) that is secured to the spool 70. First cable 74 passes through first channel 60 in spool cover 52 and out of first attachment module line orifice 64. First cable 74 further passes through first housing line orifice 48 in rear cabinet 18 for securing a second end of first cable 74 to the rear cabinet 18.

A second cable 80 (FIGS. 2, 5 and 6A) has a first end 82 (FIG. 6A) that is secured to the spool 70. Second cable 80 passes through second channel 62 in spool cover 52 and out of second attachment module line orifice 66. Second cable 80 further passes through second housing line orifice 50 in rear cabinet 18 for securing a second end of second cable 80 to rear cabinet 18.

A pair of clip mounts 86 (FIGS. 1 and 5) are provided on an outside surface of clip holder 54. A shaft 88 is located in receiving orifices defined by clip mounts 86. A belt clip 90 is pivotally mounted on shaft 88. A clip spring 92 is provided for biasing the belt clip 90 towards the clip holder 54.

Figure 7:
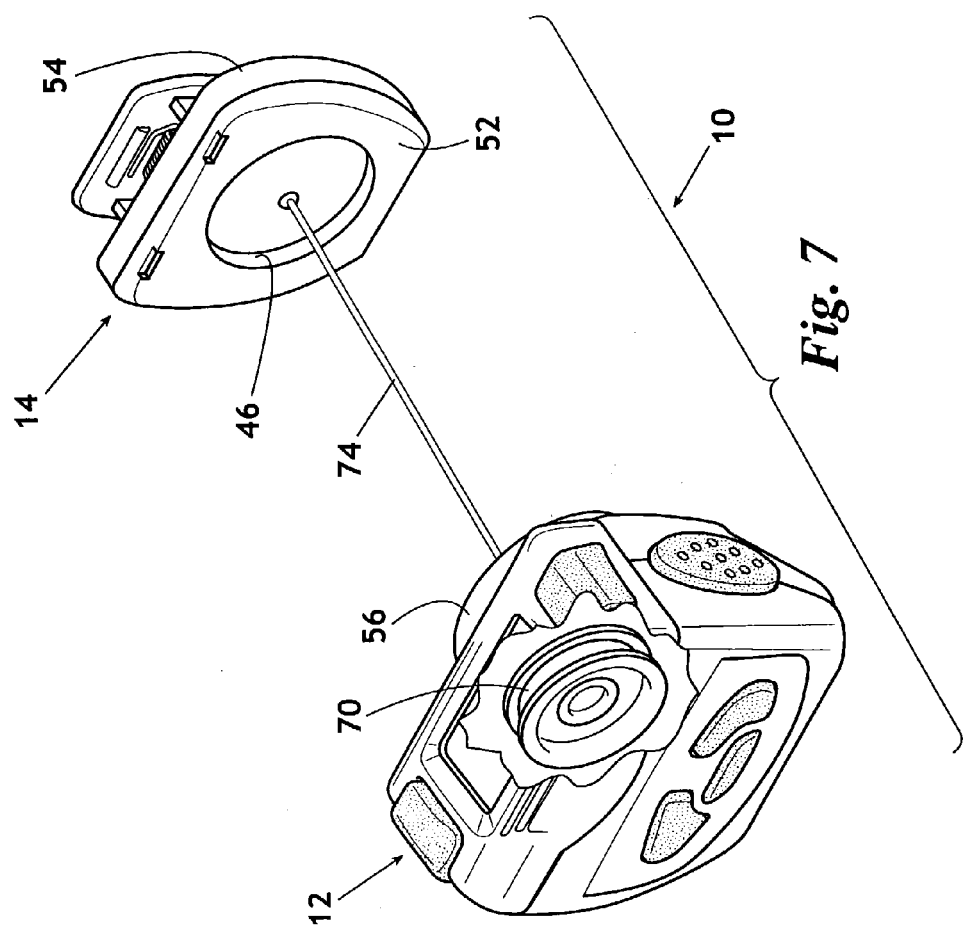
FIG. 7 is a perspective view of an alternate embodiment of the device.
Figure 4:
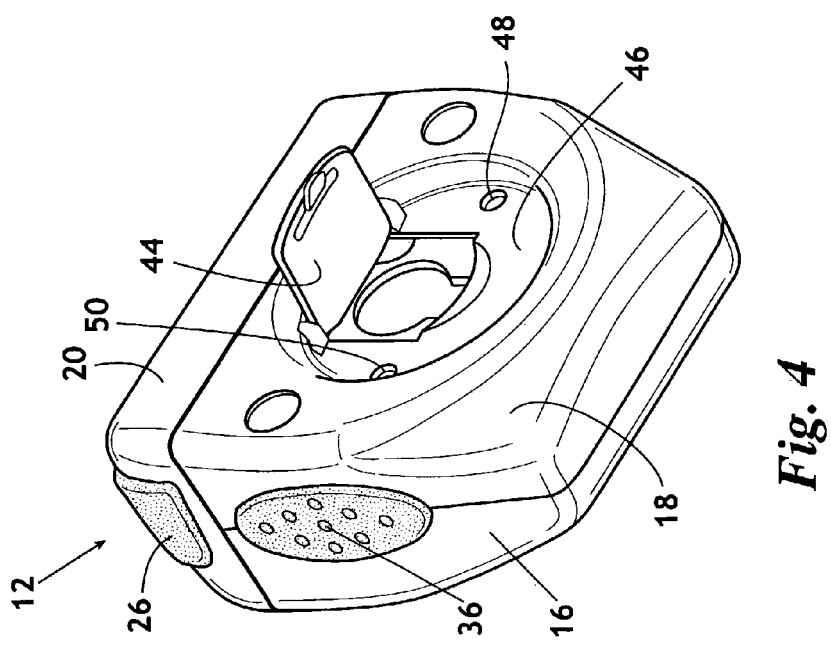
FIG. 4 is a rear perspective view of the display module which forms a part of the portable exercise device shown in FIG. 1.

An alternate embodiment of the invention may be seen in FIG. 7 wherein spool 70 is located within display module 12. A single cable 74 connects the display module 12 to the attachment module 14. To prevent relative lateral movement of the display module 12 and the attachment module 14, the display module 12 is provided with a protrusion 56 for mating engagement with recess 46, formed in attachment module 14.

In use, the portable device 10 may be attached to the waist of a user. The upper portion of belt clip 90 may be depressed by the thumb of a wearer to separate the belt clip 90 from the clip holder 54. A wearer's waist band or belt may then be inserted between the belt clip 90 and the clip holder 54. The belt clip 90 may then released. The clip spring 92 biases the belt clip 90 against the clip holder 54 to secure the portable exercise device 10 to the waist of a user.

If during use a wearer desires to view information displayed through window 22, e.g., by LCD or LED display 28, or if a wearer desires to more easily manipulate first button 24, second button 26 or any of plurality of keys 34, then the display module 12 may be separated from attachment module 14 so that display module 12 may be more easily manipulated and viewed by the wearer.

To separate the display module 12 from the attachment module 14, a wearer need only grasp the display module 12 and apply a pulling force thereto. A gripping surface on the display module 12 is provided by rubber pads 36.

The secured second end of first cable 74 and second cable 80 are maintained within the display module 12. First cable 74 and second cable 80 extend outwardly from first housing line orifice 48 and second housing line orifice 50, respectively. Upon applying a separating force to the display module 12, the first cable 74 and second cable 80 are pulled through first attachment module line orifice 64 and second attachment module line orifice 66 as spool 70 unwinds the cables 74, 80. Spool 70 unwinds the first cable 74 and second cable 80 simultaneously. The first cable 74 is pulled through the first channel 60 formed in the spool cover 52 of the attachment module 14. Similarly, as the second cable 80 is unwound from spool 70, second cable 80 passes through second channel 62, which is formed in the spool cover 52 of the attachment module 14.

As spool 70 rotates to release first cable 74 and second cable 80 spring plate 68 is wound to a tighter configuration, thereby providing a biasing force to spool 70. When a separating force ceases to be applied to the display module 12, spool 70 retracts the extended lengths of first cable 74 and second cable 80. The biasing force applied by spring plate 68 is sufficient to secure the display module 12 to the attachment module 14 upon release of the display module 12 by the wearer. Protrusion 56 is preferably provided on the spool cover 52 of attachment module 14. Protrusion 56 is sized for mating engagement with recessed area 46 formed on a rear surface of rear cabinet 18 of display module 12. Therefore, when the display module 12 is seated against attachment module 14 and held thereto by first cable 74 and second cable 80, the display module 12 is substantially prevented from lateral movement relative to attachment module 14.

Optionally, magnets may be installed in display module 12 and attachment module 14 to facilitate proper fitting of the modules when connected. Preferably, four pairs of magnets are arranged in or around recessed area 46 and protrusion 56 for mating engagement when display module 12 is seated against attachment module 14. The addition of magnets improves the "feel" for the user when the display module 12 is parked against the attachment module 14.

The resulting portable device provides advantages of being easily viewed by a wearer by permitting the display module to be moved and oriented in a manner desired by the wearer. Additionally, the benefits associated with a manipulatable display module 12 do not result in a configuration wherein the attachment module 14 and display module 12 may become separated from one another. Moreover, the biasing action of spring member 68 provides sufficient force to secure display module 12 to attachment module 14 so that the display module 12 and attachment module 14 function as a single unit when in a retracted condition as shown in FIG. 1. Finally, the mating protrusion 56 and recessed area 46 prevent relative lateral movement between the display module 12 and attachment module 14 of the exercise device.

While the invention has been described with a certain degree of particularity, it is understood that the invention is not limited to the embodiment(s) set for herein for purposes of exemplification, but is to be limited only by the scope of the attached claim or claims, including the full range of equivalency to which each element thereof is entitled.

What is claimed is:

1. A portable device comprising:
   an attachment module for removably connecting to a wearer;
   a display module defining a window for displaying information, wherein said display module is extendably and retractably connected to said attachment module; and
   wherein said display module defines a pair of line orifices for receiving a first cable and a second cable, wherein said first cable and said second cable retractably connect said display module and said attachment module.

2. The device according to claim 1 wherein:
   said display module has a front cabinet, a rear cabinet, and a top cover; and
   said top cover defines a window for displaying information.

3. The device according to claim 2 wherein said window for displaying information is visible through said top cover.

4. The device according to claim 1 further comprising:
   a button for illuminating a light acting on said information displayed in said window.

5. The device according to claim 1 further comprising:
   a button for changing a display mode of said information displayed in said window.

6. The device according to claim 1 wherein said information is displayed on an LCD display.

7. The device according to claim 1 wherein:
   one of said display module and said attachment module define a protrusion;
   one of said display module and said attachment module define a receptacle shaped for mating engagement with said protrusion, said protrusion and said mating receptacle for substantially preventing relative movement between said display module and said attachment module when said display module and said attachment module are in a retracted position.

8. The device according to claim 1 wherein:
   one of said display module and said attachment module houses a spool for housing a cable when said display module and said attachment module are in a retracted position; and
   said spool is biased in a winding direction by a biasing member.

9. The device according to claim 8 wherein:
   said spool simultaneously retracts or plays out a first cable and a second cable; and
   wherein said first cable and said second cable connect said display module and said attachment module.

10. A method of viewing a display of a portable device:
    securing an attachment module to a wearer;
    grasping a display module and imparting a separating force to said display module to pull said display module away from said attachment module;
    playing out a line connecting said attachment module and said display module;
    viewing a display on said display module; and
    taking up said played out line upon returning said display module to a position proximate said attachment module wherein a biasing force maintains said display module in proximity to said attachment module when said display module is released by said wearer; and
    wherein said step of playing out a line further comprises playing out two lines simultaneously.

11. The method according to claim 10 further comprising a step of substantially preventing relative lateral motion between said attachment module and said display module by engaging a protrusion on one of said attachment module and said display module with a receptacle on one of said attachment module and said display module wherein said protrusion and said receptacle engage in a mating relationship when said attachment module and said display module are in a retracted configuration.

12. A portable device comprising:
    an attachment module for removably connecting to a wearer;
    a display module defining a window for displaying information, wherein said display module is extendably and retractably connected to said attachment module;
    wherein said display module and said attachment module are adapted to be substantially prevented from moving relative to one another when said display module and said attachment module are retractably connected; and wherein
    said display module defines a pair of line orifices for receiving a first cable and a second cable, wherein said first cable and said second cable retractable connect said display module and said attachment module.

13. The portable device according to claim 12 further comprising:
    an actuator assembly in said display module.

14. A retractable pedometer comprising:
  an attachment module for removably connecting to a wearer;
  a display module defining a window for displaying information, wherein said display module is extendably and retractably connected to said attachment module;
  an actuator assembly in said display module;
  wherein said display module and said attachment module are adapted to be substantially prevented from moving relative to one another when said display module and said attachment module are retractably connected; and wherein
  said display module defines a pair of line orifices for receiving a first cable and a second cable, wherein said first cable and said second cable retractable connect said display module and said attachment module.

* * * * *